United States Patent
Veit et al.

(10) Patent No.: US 10,717,627 B2
(45) Date of Patent: Jul. 21, 2020

(54) CABLE SPOOL ASSEMBLY

(71) Applicant: Level 3 Communications, LLC, Broomfield, CO (US)

(72) Inventors: Dolf C. Veit, Fort Lupton, CO (US); Eric R. Peake, Loveland, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 226 days.

(21) Appl. No.: 15/925,416

(22) Filed: Mar. 19, 2018

(65) Prior Publication Data
US 2018/0282106 A1    Oct. 4, 2018

Related U.S. Application Data

(60) Provisional application No. 62/478,183, filed on Mar. 29, 2017.

(51) Int. Cl.
*B65H 75/22* (2006.01)
*B65H 75/14* (2006.01)
*G02B 6/44* (2006.01)

(52) U.S. Cl.
CPC .............. *B65H 75/22* (2013.01); *B65H 75/14* (2013.01); *G02B 6/4457* (2013.01); *B65H 2402/10* (2013.01); *B65H 2402/51* (2013.01); *B65H 2402/63* (2013.01); *B65H 2701/30* (2013.01); *B65H 2701/32* (2013.01); *B65H 2701/534* (2013.01)

(58) Field of Classification Search
CPC ...... G02B 6/4457; B65H 75/22; B65H 75/14; B65H 2402/10; B65H 2402/51; B65H 2402/63; B65H 2701/30; B65H 2701/32; B65H 2701/534
USPC ........................................................ 385/135
See application file for complete search history.

(56) References Cited

U.S. PATENT DOCUMENTS 8,774,443 B1 *   7/2014   Anderson .......... B65H 75/4431
                                                   242/378.4

* cited by examiner

*Primary Examiner* — Jerry M Blevins

(57) ABSTRACT

Aspects of the present disclosure involve a cable spool assembly. The cable spool assembly includes a first spool that is detachably coupled to a second spool by respective coupling features of the first spool and the second spool such that the first spool and the second spool are coaxially aligned.

14 Claims, 5 Drawing Sheets

CABLE SPOOL ASSEMBLY

CROSS-REFERENCE TO RELATED APPLICATION

This application is related to and claims priority under 35 U.S.C. § 119(e) from U.S. Patent Application No. 62/478, 183, filed Mar. 29, 2017, entitled "CABLE SPOOL ASSEMBLY," the entire contents of which is incorporated herein by reference for all purposes.

TECHNICAL FIELD

Aspects of the present disclosure involve a cable spooling assembly for use in coupling rack-mounted equipment, such as that used in data centers and gateway facilities.

INTRODUCTION

Data centers and gateway facilities generally include multiple computing and networking devices interconnected through a complex system of cabling. A data center is a computing hub that contains servers and storage equipment that run application software that serves, processes, and stores content and data. A gateway facility, on the other hand, is a telecommunications hub, or node, that processes and routes various forms of communication (e.g., phone calls, web browsing, streaming video) through a vast network of interconnected nodes, networks, and users. While data centers and gateway facilities may perform different functions, both facilities use similar, and often the same, equipment (e.g., servers, routers, switches, server appliances, storage libraries) and face similar cable management problems.

Proper installation of a new computing or networking device in a data center, gateway facility, or otherwise, generally requires knowing the planned location of the device relative to other existing devices to which the new device will be connected. Such information can be used to source cabling, such as jumper cables and patch cords, to connect new devices to existing devices. However, installers regularly encounter scenarios in which location information is incorrect or obsolete because racks containing existing devices may have been relocated or individual devices within a given rack may have been rearranged. Moreover, even if proper cabling is provided for an initial installation, a data center or gateway facility may require rearrangement in light of new equipment being added or existing equipment being removed or relocated.

With these thoughts in mind among others, aspects of the cable spool system disclosed herein were conceived.

SUMMARY

In one aspect of the present disclosure, a spool assembly is provided. The spool assembly includes a first spool, a second spool, and a cable. The first spool includes a first coupling feature disposed at a first end of the first spool and the second spool includes a second coupling feature at a first end of the second spool. The second coupling feature is detachably engaged to the first coupling feature such that the first spool and the second spool are coaxially aligned. The cable includes a first cable portion, a second cable portion opposite the first cable portion, and an intermediate cable portion disposed between the first cable portion and the second cable portion. The first cable portion includes a first cable and having a first cable connector and the second cable portion includes a second cable end having a second cable connector. The first cable portion is retained on the first spool, the second cable portion is retained on the second spool, and the intermediate cable portion extends through a pass through feature defined between the first spool and the second spool. The second cable portion may be unspooled by first unspooling the second cable end and, after unspooling of the second cable portion, the second spool may be detached from the first spool while the first cable portion is retained on the first spool In another aspect of the present disclosure, a spool assembly is provided that includes a first and second spool. The first spool includes a spool body and a first flange disposed at a first end of the spool body. The first flange includes a first coupling feature. The spool body defines each of an internal volume and an opening to the internal volume, the opening being disposed at a second end of the spool body that is opposite the first end. The spool assembly further includes a second spool including a second flange. The second flange includes a second coupling feature detachably coupled to the first coupling feature such that the first spool and the second spool are coaxial. The first flange defines a first notch and the second flange defines a second notch aligned with the first notch such that a cable may be spooled onto the spool assembly by inserting a first cable end into the internal volume, spooling a first portion of the cable about the first spool, passing an intermediate cable portion between the first spool and the second spool through the first notch and the second notch, and spooling a second portion of the cable about the second spool.

In yet another aspect of the present disclosure, a method of connecting a first device to a second device using a cable retained on a spool assembly. The method includes detachably coupling a first spool to a second spool and spooling a first portion of the cable onto the first spool, the first portion including a connector adapted to connect to the first device. The method further includes spooling a second portion of the cable onto the second spool, the second portion including a second connector for connecting the cable to the second device.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
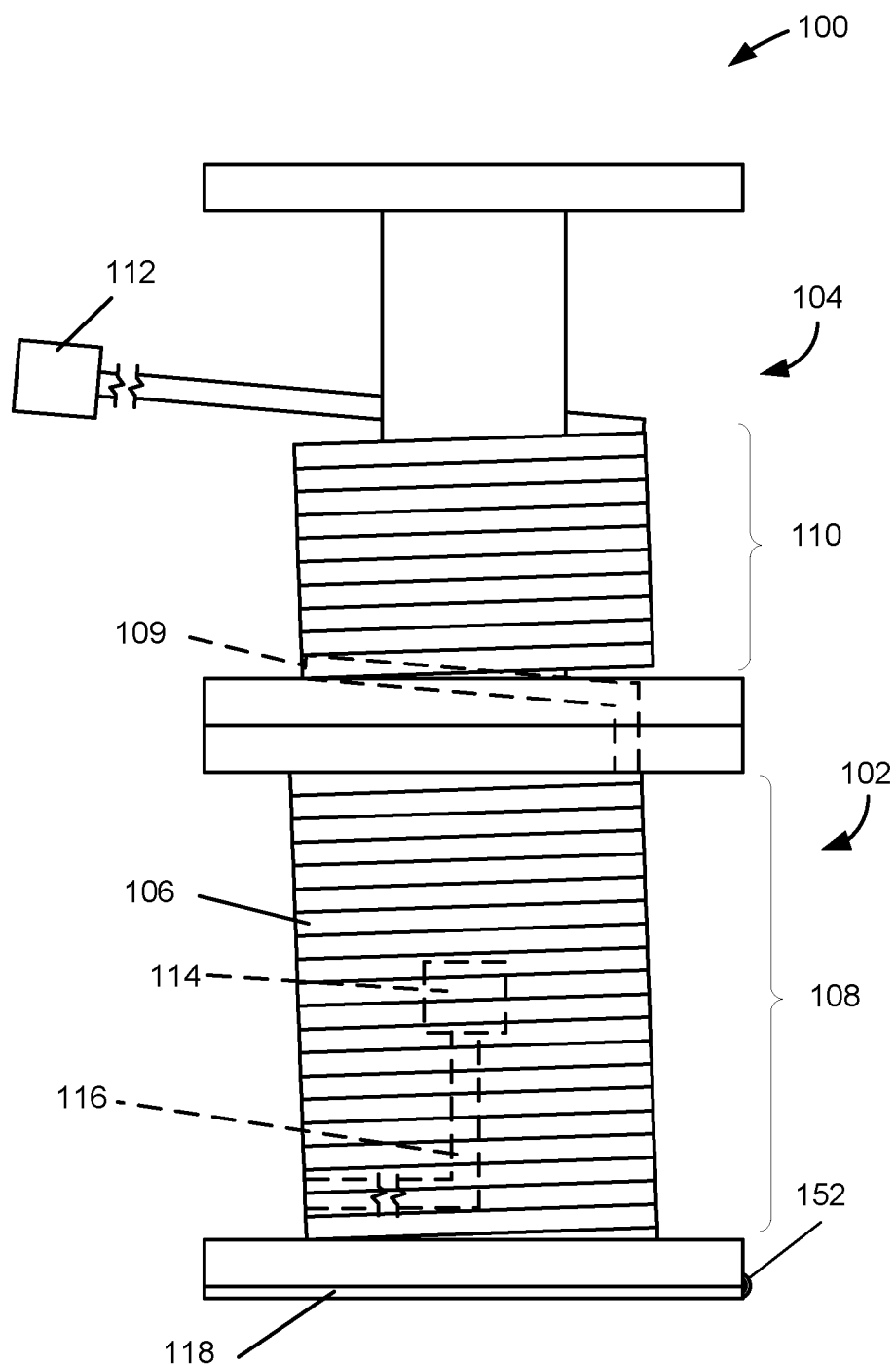
FIG. 1 is a schematic illustration of a cable spool assembly in accordance with the present disclosure.

Aspects of the present disclosure involve a cable spool assembly and system for interconnecting computing and networking equipment. Such equipment may include, without limitation, servers, routers, switches, server appliances, storage libraries, and termination panels, such as fiber termination panels, patch panels, and the like. The cable spool assembly described herein may be used to interconnect any such equipment. Accordingly, for purposes of this disclosure, such equipment is collectively referred to as "computing and networking devices" or simply "devices."

Known approaches to installing or relocating devices in a data center, gateway facility, or similar facility containing multiple interconnected devices generally involve determining the distance between devices to be coupled, sourcing a cable having the necessary length to couple the devices, and running the cable between the devices. Notably, however, such an approach is prone to costly and time-consuming errors. For example, an installer may rely on drawings or specifications to determine the distance between devices only to find out, after sourcing corresponding cables, that the drawings or specifications relied upon were outdated or included errors such that they do not represent the layout of the facility and, more importantly, the actual relative locations of the devices to be coupled. Similarly, the location of a device within a rack may differ from an original design or specification. For example, a device originally planned to be located in the top slot of a rack may instead be lowered to a middle or lower slot, thereby changing the location of the device relative to the original design by up to several feet. Such discrepancies may result in a sourced cable being too short or too long. If the cable is too short, the cable is essentially useless for the application and a new cable having the proper length must be obtained. If, on the other hand, the cable is too long, a shorter cable needs to be sourced or some unplanned for way of taking up and storing the excess cable needs to be devised.

The cable spool assembly of the present disclosure is directed to resolving these issues by providing an efficient way of interconnecting devices in a data center, gateway facility, or similar facility in which multiple interconnected devices are stored. More specifically, the described cable spool assembly enables easy and rapid interconnection of devices despite potential differences between the planned and actual locations of the devices, whether such differences are a result of errors in determining the initial distance between the devices or rearrangement of the devices sometime after initial installation. Notably, while the cable spool assembly described herein provides significant benefit in large scale facilities or when interconnecting devices having many ports or interconnection points, the cable spool assembly is not limited to such large scale applications. Rather, cable spool assemblies in accordance with this disclosure may be used in the context of any computing, telecommunication, or similar equipment facility, including those of varying size and complexity.

The cable spool assembly generally includes a first spool that is detachably coupled to a second spool. The second spool retains a remote terminal end of a cable along with a predetermined length of the cable to extend from a local device to a remote device. The first spool, on the other hand, retains excess cable to account for potential differences between the predetermined length retained on the second spool and the actual distance between the local device and the remote device as well as potential changes in cable length requirements, such as changes resulting from movement of either the remote or local. More specifically, if additional cable length is required, cable may be unspooled from the first spool. If, on the other hand, less cable length is required, the excess cable may be taken up by the first spool. A local terminal end of the cable is also accessible from the first spool to facilitate connection to the local device.

After connecting the remote terminal end to the remote device, the second spool may be detached from the first spool such that the first spool may be stored at the local device. For example, in certain implementations, the local device is a termination panel, such as a fiber termination panel, and the first spool may be sized to fit within the termination panel when decoupled from the second spool.

FIG. 1 is a schematic illustration of a cable spool assembly 100 according to one implementation of the present disclosure. The cable spool assembly 100 includes a first spool 102 detachably coupled to a second spool 104.

A cable 106 may be disposed about and retained by the spools 102, 104 of the spool assembly 100. The cable 106 includes two terminal ends, referred to for clarity as a remote terminal end 112 and a local terminal end 114. The cable 106 may be any suitable type of cable configured to couple one or more local devices with one or more remote devices. The present disclosure is not limited to any particular type of cable and, as a result, cable spool assemblies and systems disclosed herein may be used with a wide range of cable types including, without limitation, fiber optic cables, coaxial cables, and straight-pair, twisted-pair, and multicore twisted-pair cables. Similarly, the present disclosure is not limited to specific quantities of cable cores. Accordingly, cable spool assemblies and systems may be used with any of simplex, duplex, and multiplex cables. Moreover, the cable 106 is not limited to a single, unitary cable and may include multiple shorter cables that are spliced or otherwise coupled together to form the cable 106.

The cable 106 is generally distributed between the first spool 102 and the second spool 104. More specifically, a first portion 108 of the cable 106 is retained by the first spool 102 while a second portion 110 of the cable 106 is retained by the second spool 104 with an intermediate cable portion 109 extending between the first portion 108 and the second portion 110 and, as a result, between the first spool 102 and the second spool 104. The overall length of the cable 106 as well as the distribution of the cable 106 between the first portion 108 and the second portion 110 may vary. However, in certain implementations, the second portion 110 generally has a length approximately equal to a predetermined distance between a local device and a remote device. The first portion 108 generally includes the remaining length of the cable 106. In certain implementations, the total length of the cable 106 is provided in incremental lengths, such as one of 50 or 100 foot increments. Accordingly, the spool assembly 100 may be provided with a wide range of total cable lengths and with varying proportions of the overall cable length distributed between the first spool 102 and the second spool 104.

In certain implementations, a terminal portion 116 of the cable 106, and more specifically of the first portion 108 of the cable 106, is stored within the first spool 102. The terminal portion 116 generally includes the local terminal end 114 and a sufficient portion of the cable 106 to permit connection of the local terminal end 114 to the local device without requiring unspooling of any of the first portion 108. To do so, the local terminal end 114 and at least some of the terminal portion 116 may be pulled from the interior of the first spool 102. In certain implementations, the first spool 102 includes a cap 118 or similar structure for retaining the terminal portion 116 within the first spool 102. The cap 118 may be removed from the first spool 102 to allow the local terminal end 114 to be pulled from within the first spool 102.

In certain implementations, the cap 118 is adapted to snap onto or otherwise be retained by the first spool 102. The cap 118 may also be attached to the first spool 102. For example, the cap 118 of FIG. 1 is coupled to the first spool 102 by a hinge 152, which may be, but is not limited to, a living hinge integrally formed with the cap 118 and the first spool 102.

Figure 2:
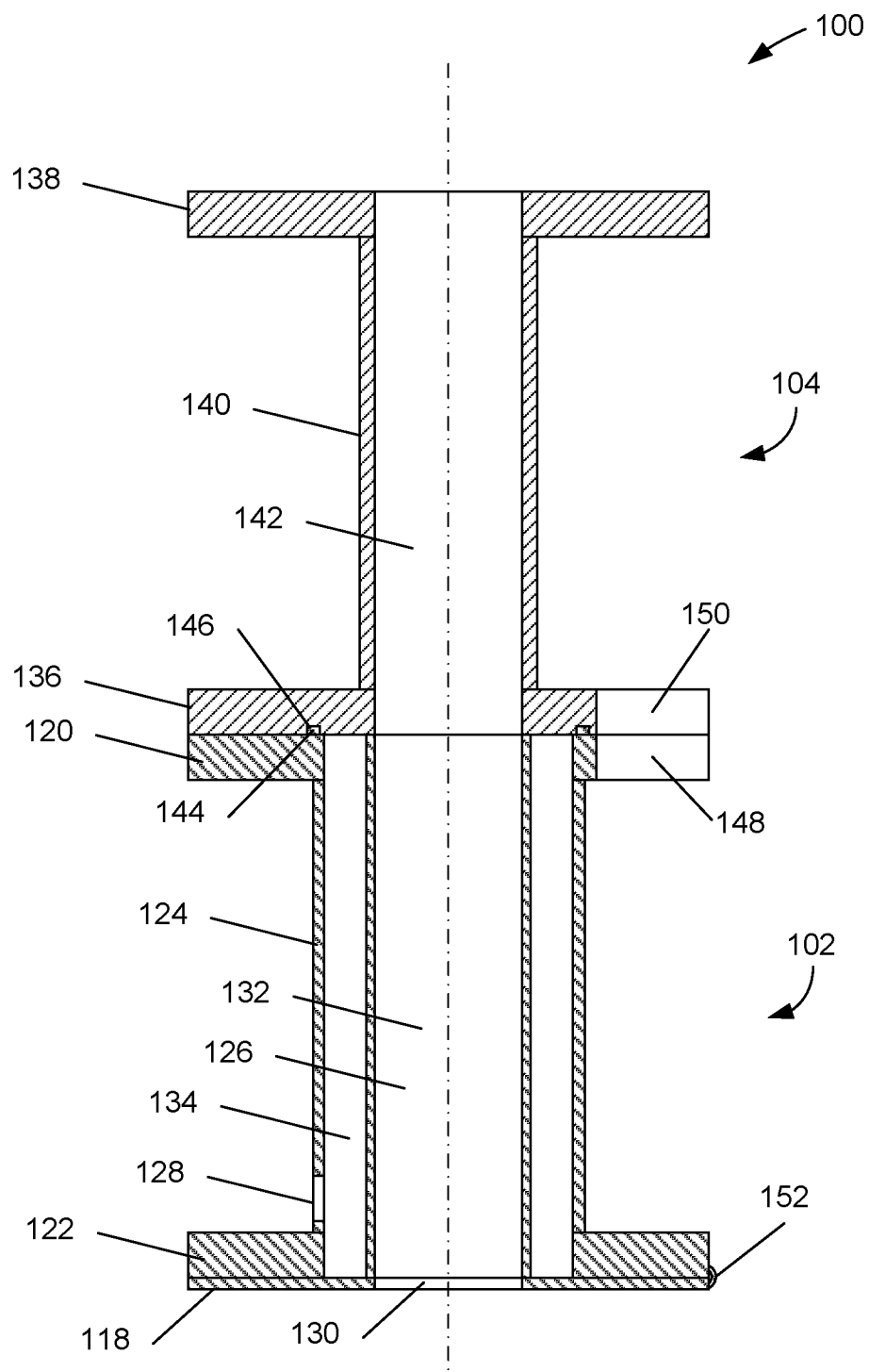
FIG. 2 is a cross-sectional view of the cable spool assembly of FIG. 1.

FIG. 2 is a cross-sectional view of the cable spool assembly 100 of FIG. 1 with the cable 106 removed to show additional details of the first spool 102 and the second spool 104.

The first spool 102 may include a first flange 120 and a second flange 122 disposed on opposite sides of a first spool drum 124. The first spool drum 124 defines an inner first spool volume 126 within which the terminal portion 116 of the cable 106 may be retained. For example, the terminal portion 116 may be inserted into the inner volume 126 through an aperture 128 defined by the first spool drum 124 at the beginning of a spooling operation. The cap 118 may also include a cap aperture 130 through which a rod or similar structure may be inserted to facilitate unspooling of the cable 106 or storage of the first spool 102. In certain implementations, the inner first spool volume 126 may be divided into two or more chambers to separate the stored terminal portion 116 of the cable 106 from a rod inserted through the first spool 102. For example, the first spool 102 may include an inner chamber 132 through which the rod may extend and an outer chamber 134 within which the terminal portion 116 is stored.

The second spool 104 may similarly include a third flange 136 and a fourth flange 138 disposed on opposite sides of a second spool drum 140, which further defines an inner second spool volume 142. Although the first spool drum 124 and the second spool drum 140 are depicted in FIG. 2 as having different diameters, embodiments of this disclosure are not limited to any particular diameters or diameter relationships of the first spool drum 124 and the second spool drum 140. However, in certain implementations, the inner diameter of the second spool drum 140 is at least sufficiently wide to permit a rod (or similar structure) inserted into the first spool 102 for purposes of facilitating unspooling of the cable 106 to extend through the second spool 104 as well. As shown in FIG. 2, when coupled, the first spool 102 and the second spool 104 are substantially coaxial. As a result, the inner first spool volume 126 and the inner second spool volume 142 define a continuous volume extending through the spool assembly 100.

The second spool 104 is configured to be detachably coupled to the first spool 102. Accordingly, in certain implementations, the first spool 102 includes a first spool coupling feature 144 and the second spool 104 includes a second spool coupling feature 146. The first spool coupling feature 144 and the second spool coupling feature 146 may take various forms. In FIG. 2, for example, the first spool coupling feature 144 is a tongue extending around the first flange 120 and shaped to mate with the second spool coupling feature 146, which is in the form of a groove defined by the third flange 136. In alternative implementations, this arrangement may be reversed such that the first spool coupling feature 144 is a groove defined by the first flange 120 and the second spool coupling feature 146 is a tongue extending from the third flange 136. In either case, the tongue and groove may be shaped such that an interference or press fit is formed between the tongue and groove when coupled, thereby retaining the first spool 102 relative to the second spool 104. Alternatively, the tongue and groove structure may include tabs, protrusions, or similar features that, when aligned, retain the tongue within the groove and the first spool 102 relative to the second spool 104.

The coupling of the first spool 102 to the second spool 104 is not limited to tongue and groove arrangements and alternative means for detachably coupling the first spool 102 to the second spool 104 are possible. For example, in certain implementations, the first spool 102 and the second spool 104 may be coupled together using one or more clips disposed about the first flange 120 and the third flange 136. In another implementation, one or more plastic or metal fasteners may be inserted through bores formed in the first flange 120 and the third flange 136. Such fasteners may then be retained by an interference fit with either the first flange 120 or the third flange 138 or by a complementary fastener, such as a nut, pin, or snap washer. In yet another implementation, complimentary strips of a hook-and-loop fastener, such as Velcro® brand hook-and-loop fastener, may be placed on the first flange 120 and the third flange 136. In still another implementation, magnets disposed in the first flange 120 and the third flange 136 may be used to couple the first spool 102 to the second spool 104.

In certain implementations, either of the first flange 120 and the third flange 136 may be omitted. In such implementations, the coupling feature of a spool for which a flange is omitted may instead be incorporated directly into the end of the corresponding spool drum. For example, the third flange 136 may be replaced with threads formed into the end of the second spool drum 140 and configured to engage corresponding threads formed into the first flange 120. In alternative embodiments, coupling features other than threads may be used to couple the end of the first spool drum 124 of the second spool drum 140 to the second spool 104 and the first spool 102, respectively. Such coupling features may include, for example, a twist and lock coupling in which pegs extending from the interior or exterior of one of the first spool drum 124 and the second spool drum 140 mate with corresponding slots defined in the second spool drum 140 and the first spool drum 124, respectively.

As used herein, the term "coupling feature" is intended to be interpreted broadly and to refer to any suitable mechanical structure that facilitates detachably coupling the first spool 102 to the second spool 104. The coupling features are generally disposed on an end of the first spool 102 and/or the second spool 104 such that the first spool 102 and the second spool 104 can be retained in a coaxial alignment. Accordingly, a coupling feature may be disposed on, incorporated into, or defined by, without limitation, one or more of a flange disposed on an end of the spools 102, 104 (such as the first flange 120 and the third flange 136), an end of a spool drum of the spools 102, 104 (such as the first spool drum 124 and the second spool drum 140), or any similar structure of the first spool 102 and the second spool 104. In certain implementations, coupling features are structural elements of the first spool 102 and/or the second spool 104 that positively engage each other. For example, in such implementations, the coupling feature of the first spool 102 and the second spool 104 may include, without limitation, a tongue and corresponding groove, mating dovetails, a mortise and corresponding tenon, mating dados, one or more sets of mating threads, structural elements configured to twist and lock relative to each other, concentric tapered tubes, and the like. In certain implementations, the mechanical structures of the first spool 102 and the second spool 104 may be engaged by a press, snap, or interference fit. For example, a tongue of the first spool 102 may be sized such that an interference fit is formed when the tongue is inserted into a corresponding groove of the second spool 104. Similarly, the second spool drum 140 may be tapered such that as it is inserted into the first spool drum 124, the second spool drum 140 forms a press fit with the first spool drum 124. In other implementations, the mechanical structures retain the first spool 102 relative to the second spool 104 by some form of positive mechanical engagement. For example, the mechanical features of the first spool 102 and the second spool 104 may include tabs, protrusions, or similar structural elements that, when aligned, retain the first spool 102 relative to the second spool 104. In still other implementations, coupling features include structures of the first spool 102 and the second spool 104 configured to receive a separate component for fixing the first spool 102 relative to the second spool 104. For example, in such implementations, each of the first spool 102 and the second spool 104 may include, without limitation, one or more of a surface, hole, groove, lip, channel, ridge, notch, thread, tongue, or similar structural feature shaped to abut, engage, mate with, or otherwise receive a fastener configured to detachably couple the first spool 102 from the second spool 104. Such fasteners may include, without limitation, one or more of a clip; a nut; a bolt; a pin; a peg; a retaining ring; a length of string, rope, wire, or cable; a screw; a rivet; a piece of adhesive; a piece of hook-and-loop fastener material (in which a hook coupled to one of the first spool 102 and the second spool 104 engages a loop coupled to the second spool 104 and the first spool 102, respectively); a magnet; a piece of magnetic metal or other magnetic material; and any other component that may be received by at least one of the first spool 102 and the second spool 104 and that is adapted to maintain the position of the first spool 102 relative to the second spool 104.

As shown in FIG. 2, in certain implementations of the present disclosure, the first flange 120 may include a pass through feature 148 through which the intermediate cable portion 109 passes to allow the cable 106 to be run from the first spool 102 to the second spool 104 without having to traverse around the outside of the first flange 120. In the implementation illustrated in FIG. 2, the pass through feature 148 is a first notch 148 extending inwardly from an outer edge of the first flange 120 and the third flange 136. The third flange 136 similarly includes a second notch 150 extending inwardly from an outer edge of the third flange 136. The first notch 148 and the second notch 150 are positioned such that when the second spool 104 is coupled to the first spool 102, the notches 148, 150 are aligned and allow the cable 106 to be run from the first spool 102 to the second spool 104 without having to traverse around each of the first flange 120 and the third flange 136, thereby protecting the cable 106 by reducing bending of the cable 106 as it transitions from the first spool 102 to the second spool 104. As previously noted, in certain implementations, either of the first flange 120 and the third flange 136 may be omitted. In such implementations, a corresponding notch may be retained in the remaining flange to facilitate transition of the cable from the first spool 102 to the second spool 104. In addition to the notches 148, 150 illustrated in FIG. 2, other suitable pass through features may include, without limitation, slots, holes, grooves, and other structural features adapted to reduce at least one of the distance or angle to which the cable 106 is subjected in transitioning between the first spool 102 and the second spool 104.

In implementations according to this disclosure, the cable 106 is spooled onto the cable spool assembly 100 by inserting the local terminal end 114 into the first spool 102 and spooling the first cable portion 108 about the first spool drum 124. The intermediate cable portion 109 is then passed through the pass through features 148, 150 and the second cable portion 110 is spooled onto the second spool drum 140, ending with spooling of the remote terminal end 112. Accordingly, unspooling of the cable 106 involves unspooling the remote terminal end 112 followed by the second cable portion 110. After unspooling of the second cable portion 110, the second spool 104 may or may not be detached from the first spool 102. In either case, further unspooling involves removing the intermediate cable portion 109 from the pass through features 148, 150 and unspooling the first cable portion 108 from the first spool drum 124. At any time, the local terminal end 114 may be pulled from within the first spool 102.

Figure 3A:
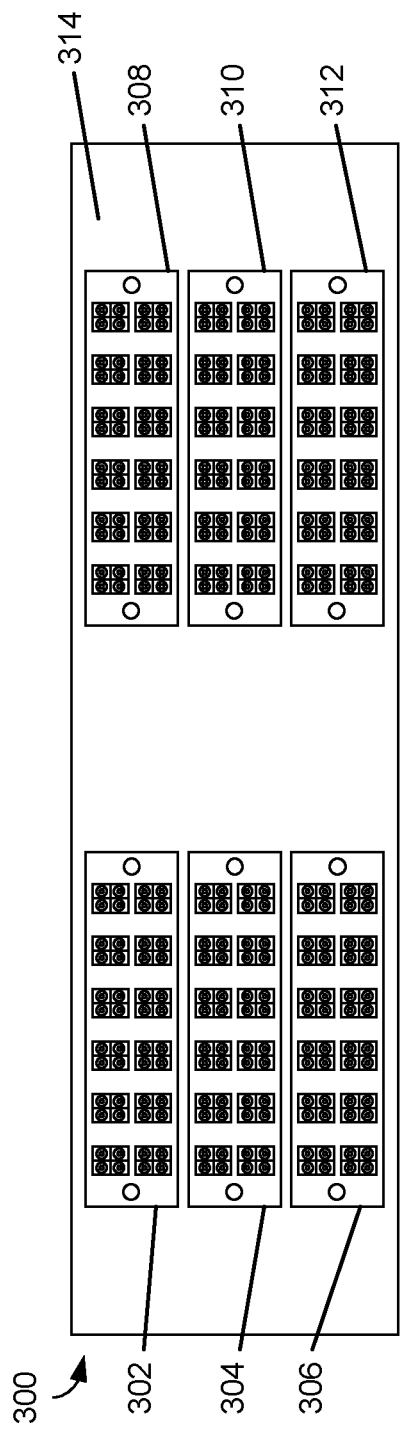
FIG. 3A is a front view of a local device for use with spool assemblies in accordance with the present disclosure.
Figure 3B:
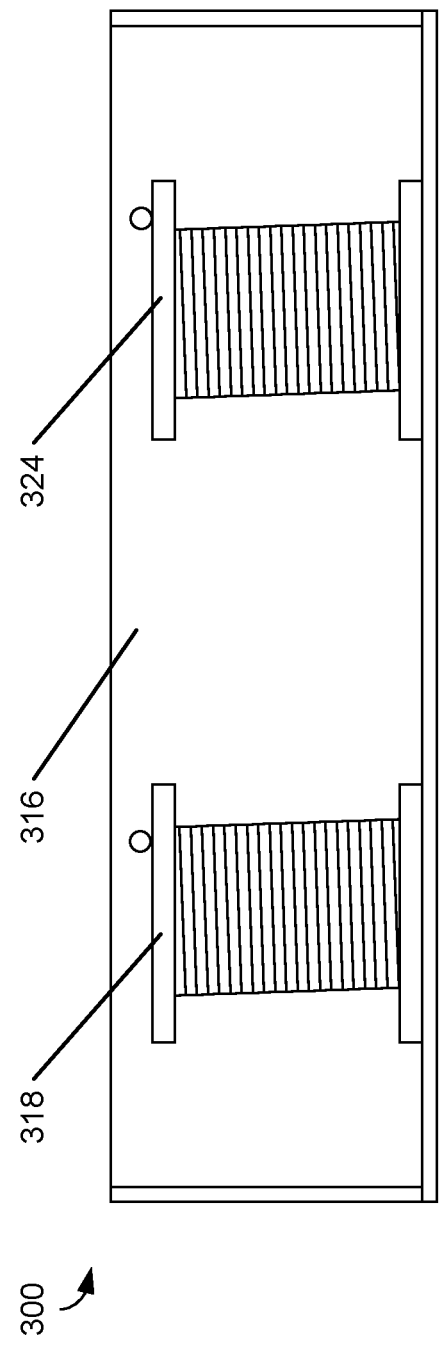
FIG. 3B is a second front view of the local device of FIG. 3A with a front panel removed.
Figure 3C:
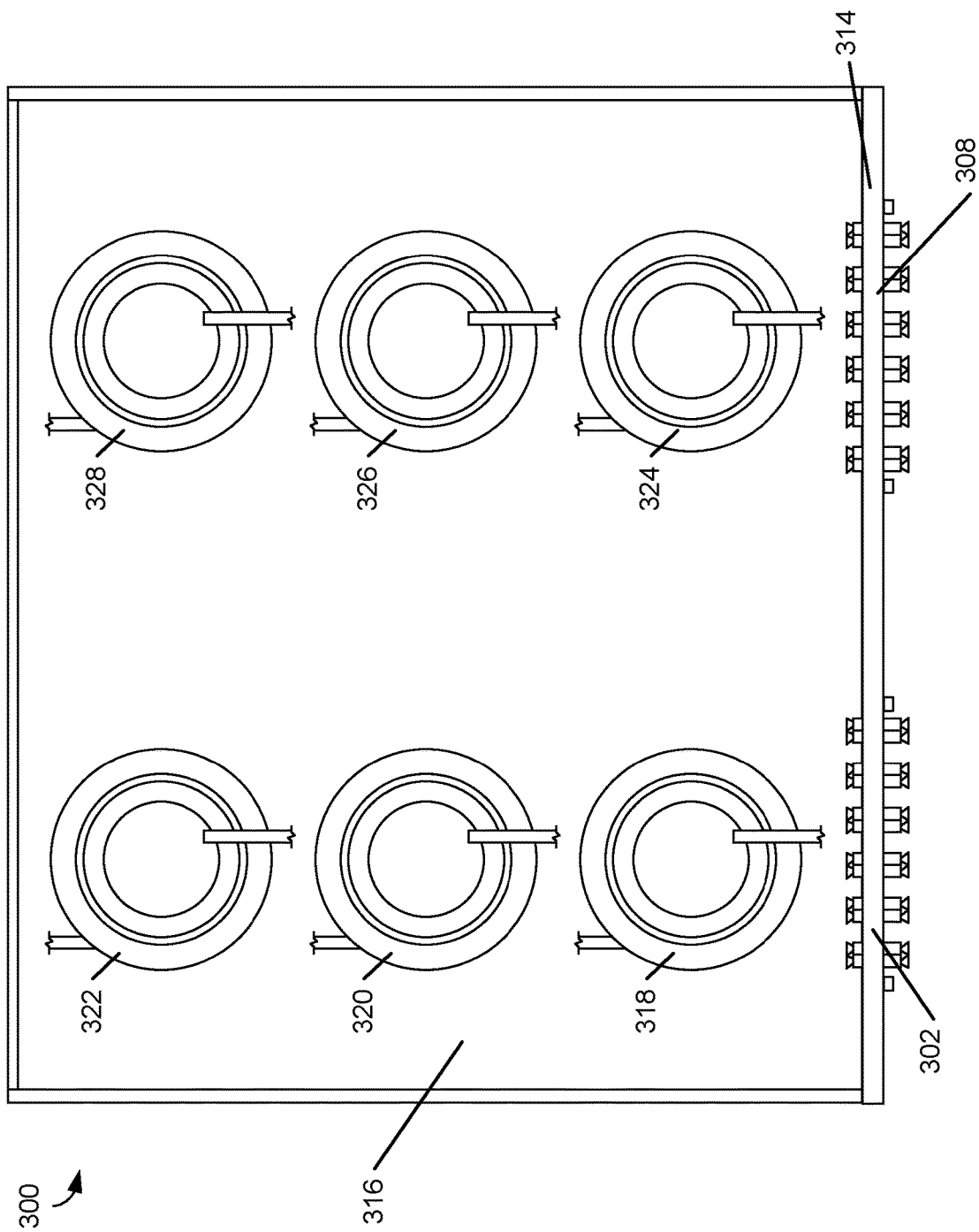
FIG. 3C is a top-down view of the local device of FIG. 3A.

FIGS. 3A-C are schematic illustrations of an example local device 300 for use with cable spool assemblies in accordance with this disclosure. As shown in FIG. 3A, local device 300 is a rack-mounted fiber termination panel 300 including a plurality of fiber patch panels 302-312 mounted to a front plate 314. FIGS. 3B and 3C depict an interior 316 of the fiber termination panel 300. FIG. 3B is a front view from the same perspective as FIG. 3A but with the front plate 314 removed. FIG. 3C is a top-down view of the fiber termination panel 300 shown in FIG. 3A.

Referring to FIG. 3A, the fiber patch panels 302-312 of the rack-mounted fiber termination panel 300 are depicted as being LC-type fiber optic connectors. More specifically, each of the fiber patch panels 302-312 includes two banks of twelve LC-to-LC ports. In alternative implementations, the rack-mounted fiber termination panel 300 may include any number of fiber optic ports of any available fiber optic connector type or combinations of connector types. For example, in certain implementations, each of the fiber patch panels may include a multi-fiber push on (MPO)-type connector (such as an MTP® brand connector) and break out each fiber coupling in the MPO-type connector to separate LC ports. Other types of fiber optic connectors that may be used include, without limitation, ST, FC, MU, MTRJ, D4, E2000, Biconic, MT, SMC, and SMA type connectors.

In implementations of the present disclosure, the local device is generally configured to house one or more spools after decoupling of the spools from corresponding second spools. For example, as shown in FIGS. 3B and 3C, the fiber termination panel 300 includes a chassis 316 sized to contain a plurality of spools 318-328, each of which stores cable to be coupled to a corresponding one of the fiber patch panels 302-312. As a result, the spools 318-328 are conveniently stored within the local device 300 to facilitate adjustment of the length of cable extending from the spools 318-328 to corresponding remote devices or to the fiber patch panels 302-312. In certain implementations, the chassis may include posts or similar retention features for retaining the spools 318-328. Such retentions features may be shaped to be inserted into or engage features of the spools 318-328. For example, and with reference to FIG. 2, such features may include one or more of the cap 118, the cap aperture 130, the second flange 122, a wall of one or both of the inner chamber 132 and the outer chamber 134, and the spool drum 124.

The fiber termination panel 300 of FIGS. 3A-3C is only an example of a local device that may be implemented in accordance with the present disclosure. In alternative implementations, the local device may be a different type of termination panel, such as an Ethernet patch panel. In still other implementations, the local device 300 may be a server, router, switch, server appliance, storage library, or other type of rack-mounted equipment housed in a chassis sufficiently sized to store one or more spools.

Figure 4:
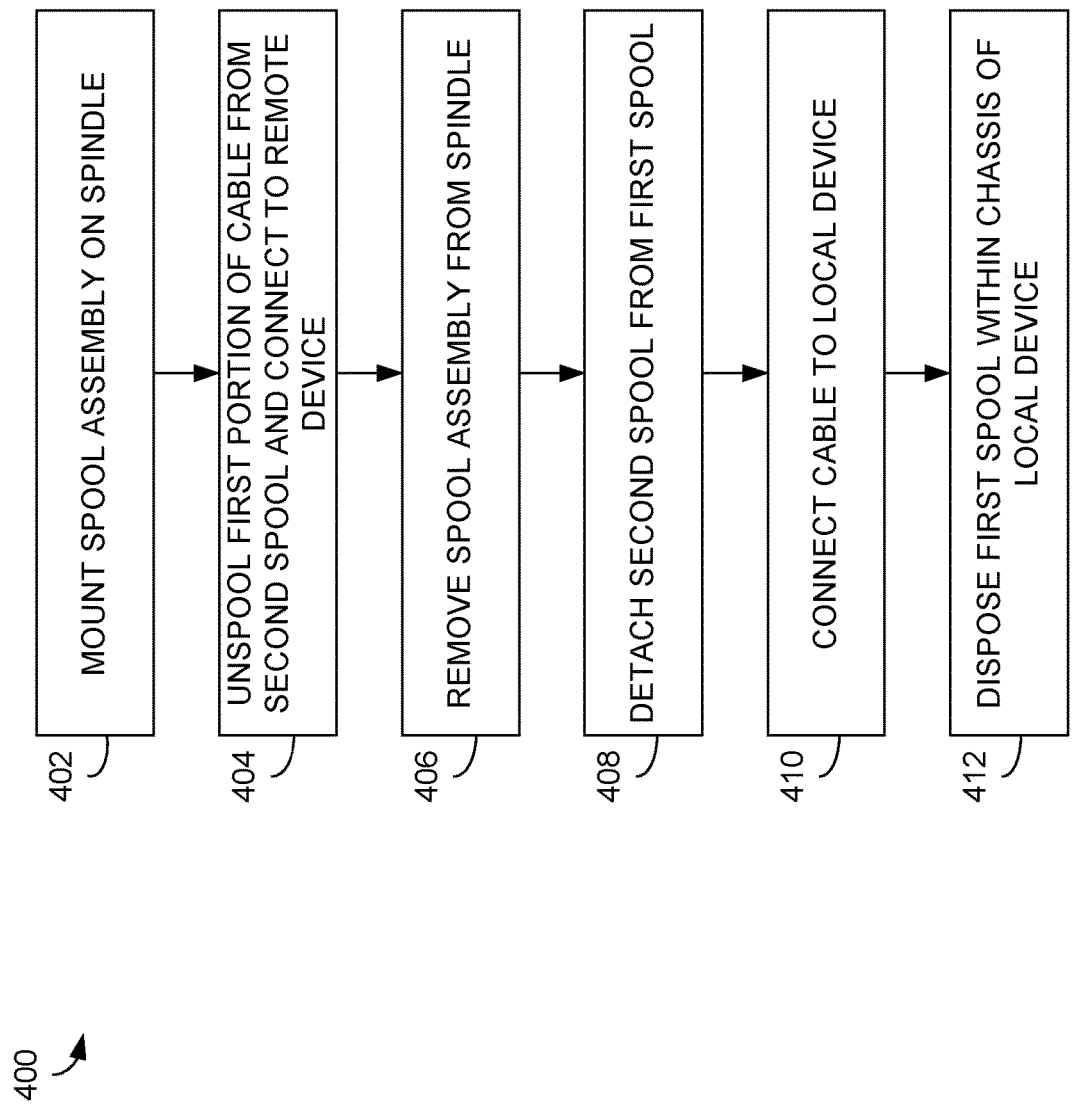
FIG. 4 is a flow chart illustrating a method of coupling a remote device and a local device using spool assemblies in accordance with the present disclosure.

FIG. 4 is a flow chart illustrating a method 400 of connecting a local device to a remote device using spool assemblies according to the present disclosure, such as the spool assembly 100 of FIGS. 1 and 2.

With reference to the spool assembly 100 of FIGS. 1 and 2, at step 402 the spool assembly 100 is mounted on a spindle or similar structure configured to support the spool assembly 100 during unspooling of the cable 106. As shown in FIG. 2, when the first spool 102 is coupled to the second spool 104, the first spool drum 124 and the second spool drum 140 are substantially coaxial, enabling insertion of the spindle through each of the first spool drum 124 and the second spool drum 140. The spindle onto which the spool assembly 100 is disposed for unspooling may take various forms. For example, in certain implementations, the spindle is coupled to or otherwise part of an equipment rack in which the local device is installed. In other implementations, the spindle may be portable. For example, the spindle may be disposed on a cart or may simply be a rod held by an operator during unspooling.

After mounting the spool assembly 100, the second portion 110 of the cable 106 is unspooled from the second spool 104 and run to the remote device (step 404). To the extent the second portion 110 of the cable 106 is insufficient to reach the remote device, some of the first portion 108 of the cable 106 may also be unspooled to extend the length of the cable 106 between the first spool 102 and the remote device.

When sufficient cable is unspooled to reach the remote device, the spool assembly 100 is removed from the spindle (step 406) and the second spool 104 is detached from the first spool 102 (step 408). For example, referring to FIG. 2, the second spool 104 and the first spool 102 may be pulled apart to disengage the first spool coupling feature 144 (which is shown as a tongue) from the second spool coupling feature 146 (which is shown as a groove corresponding to the tongue). As previously discussed, other methods of detachably coupling the first spool 102 and the second spool 104 are possible. Accordingly, the step of decoupling the first spool 102 from the second spool 104 may alternatively include one or more of removing fasteners or clips, unthreading the first spool 102 from the second spool 104, twisting and unlocking the first spool 102 from the second spool 104, and any other operation for decoupling the first spool 102 from the second spool 104.

After decoupling of the second spool 104 and the first spool 102, the terminal portion 116 of the cable 106, may be connected to the local device (steps 410) and the first spool 102 may be disposed within a chassis of the local device (step 412). Steps 410 and 412 may be performed in opposite order if practicable, i.e., the first spool 102 may be disposed within the chassis before connecting the terminal portion 116 to the local device. In certain implementations, the step of connecting the terminal portion 116 to the local device may include pulling the terminal portion 116, at least partially from an internal chamber of the first spool 102.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A spool assembly comprising:
a first spool comprising a first coupling feature disposed at a first end of the first spool;
a second spool comprising a second coupling feature at a first end of the second spool, the second coupling feature detachably engaged to the first coupling feature such that the first spool and the second spool are coaxially aligned; and
a cable comprising:
a first cable portion including a first cable end including a first connector;
a second cable portion opposite the first cable portion and including a second cable end, the second cable end including a second connector; and
an intermediate cable portion disposed between the first cable portion and the second cable portion;
wherein the first cable portion is retained on the first spool, the second cable portion is retained on the second spool, and the intermediate cable portion extends through a pass through feature defined between the first spool and the second spool,
whereby the second cable portion may be unspooled by first unspooling the second cable end and, after unspooling of the second cable portion, the second spool may be detached from the first spool while the first cable portion is retained on the first spool,
wherein the first spool comprises a spool drum defining an internal volume, the first cable end extending into the internal volume and wherein the spool drum further defines a passage extending through a wall of the spool drum into the internal volume, the first cable end extending into the internal volume through the passage.

2. The spool assembly of claim 1, wherein the first end of the first spool includes a first annular flange and the first end of the second spool comprises a second annular flange, the first annular flange comprising the first coupling feature and the second annular flange comprising the second coupling feature.

3. The spool assembly of claim 1, wherein the first spool further comprises a cap detachably coupled to a second end of the first spool, the second end of the first spool disposed opposite the first end of the first spool, and the cap covers an opening to the internal volume when coupled to the second end of the first spool.

4. The spool assembly of claim 1, wherein the second spool further comprises a second spool drum defining a second inner volume contiguous with the internal volume of the first spool drum.

5. The spool assembly of claim 1, wherein at least one of the first spool or the second spool comprises a flange disposed at their respective first end, the flange having an outer diameter and defining the pass through feature through which the intermediate cable portion extends, the pass through feature disposed, at least in part, inward of the outer diameter.

6. The spool assembly of claim 5, wherein the pass through feature is a notch defined by the flange.

7. The spool assembly of claim 1, wherein the first coupling feature is positively engaged with the second coupling feature.

8. The spool assembly of claim 1 further comprising a fastener, wherein the fastener detachably engages the first coupling feature to the second coupling feature.

9. A spool assembly comprising:
a first spool comprising a first coupling feature disposed at a first end of the first spool;
a second spool comprising a second coupling feature at a first end of the second spool, the second coupling feature detachably engaged to the first coupling feature such that the first spool and the second spool are coaxially aligned; and
a cable comprising:
a first cable portion including a first cable end including a first connector;
a second cable portion opposite the first cable portion and including a second cable end, the second cable end including a second connector; and
an intermediate cable portion disposed between the first cable portion and the second cable portion;
wherein the first cable portion is retained on the first spool, the second cable portion is retained on the second spool, and the intermediate cable portion extends through a pass through feature defined between the first spool and the second spool,
whereby the second cable portion may be unspooled by first unspooling the second cable end and, after unspooling of the second cable portion, the second spool may be detached from the first spool while the first cable portion is retained on the first spool,
wherein the first spool comprises a spool drum defining an internal volume, the first cable end extending into the internal volume and wherein the internal volume is divided into an inner and outer volume by an internal wall and the first cable end extends into the outer volume.

10. The spool assembly of claim 9, wherein the spool drum further defines a passage extending through a wall of the spool drum into the internal volume, the first cable end extending into the internal volume through the passage.

11. A spool assembly comprising:
a first spool comprising a first coupling feature disposed at a first end of the first spool;
a second spool comprising a second coupling feature at a first end of the second spool, the second coupling feature detachably engaged to the first coupling feature such that the first spool and the second spool are coaxially aligned; and
a cable comprising:
a first cable portion including a first cable end including a first connector;
a second cable portion opposite the first cable portion and including a second cable end, the second cable end including a second connector; and
an intermediate cable portion disposed between the first cable portion and the second cable portion;
wherein the first cable portion is retained on the first spool, the second cable portion is retained on the second spool, and the intermediate cable portion extends through a pass through feature defined between the first spool and the second spool,
whereby the second cable portion may be unspooled by first unspooling the second cable end and, after unspooling of the second cable portion, the second spool may be detached from the first spool while the first cable portion is retained on the first spool,
wherein the first coupling feature comprises one of a hook and a loop of a hook-and-loop fastener material and the second coupling feature comprises one of a corresponding loop and a corresponding hook, respectively.

12. A spool assembly comprising:
a first spool comprising a spool body and a first flange disposed at a first end of the spool body, the first flange including a first coupling feature, the spool body defining an internal volume and an opening to the internal volume, the opening disposed at a second end of the spool body opposite the first end; and
a second spool comprising a second flange, the second flange comprising a second coupling feature detachably coupled to the first coupling feature such that the first spool and the second spool are coaxial;
wherein the first flange defines a first notch and the second flange defines a second notch aligned with the first notch such that a cable may be spooled onto the spool assembly by inserting a first cable end into the internal volume, spooling a first portion of the cable about the first spool, passing an intermediate cable portion between the first spool and the second spool through the first notch and the second notch, and spooling a second portion of the cable about the second spool, and
wherein the spool body further defines an inner chamber and a second chamber about the inner chamber.

13. The spool assembly of claim 12, wherein the first spool further comprises a detachable cover coupled to the opening.

14. The spool assembly of claim 12, wherein the spool body further defines a second opening extending perpendicular to the opening, the second opening defining a path extending into the second chamber.

* * * * *